July 16, 1929.  P. BELYAVIN  1,720,993

AUTOMATIC VALVE

Filed May 27, 1926

Inventor
Paul Belyavin
By B. Singer, Atty.

Patented July 16, 1929.

UNITED STATES PATENT OFFICE.

PAUL BELYAVIN, OF NEWCASTLE-ON-TYNE, ENGLAND.

AUTOMATIC VALVE.

Application filed May 27, 1926, Serial No. 112,104, and in Great Britain June 12, 1925.

This invention relates to an improved construction of automatic valves for use with pumps, compressors and for other purposes, and has for its chief object to simplify and cheapen the construction of the valve and lengthen its life.

Valves of the type made of a thin strip of flexible metal or any other suitable material are usually arranged in parallel rows on a flat surface, and a curved bar, acting as a stop is arranged over each valve to prevent it from lifting too far. This design has some very important disadvantages, which reduce the life of the valve of this description and make its manufacture difficult and expensive.

When the valve is lifted, and is coming back on its seat due to change of pressure in the pump, it is being knocked hard against its seat, if the change of pressure happens before the valve had time to come down on its seat due to its own weight or the action of a spring.

To reduce this shock, it is necessary to give the valve some initial springing, which will assist the valve to come down for the change of pressure will bring it down with a knock. In a valve with a flat seat it will only be possible if special additional springs are used to press the valve against its seat. However, if the valve seat is made cylindrical, and the valve made a thin flexible strip held on its seat in a bent position, the valve will act as its own spring and the additional springs will not be required.

Again, in the valves with a flat seat the curved bar arranged over the valve to act as a stop, must be machined with a big radius, and the ends of this curved bar over the valve must be very accurately adjusted to prevent the ends of the valve from being nipped. This makes the machining of the curved stop a difficult and expensive operation.

To overcome all the above disadvantages, I suggest, that the seat for the type of valves made as a thin flexible strip of metal or any other suitable material, should be arranged on a cylindrical surface, with the surface acting as a stop to the valve, arranged on the inside of an outer cylinder or part of a cylinder, placed over the cylindrical surface acting as a valve seat.

In the arrangement like the one described above, all the difficulties met in this type of valves will be overcome.

The machining of the stop surfaces over the valves, the curvature of which will have a much smaller radius, is a simple proposition, and the valve, which is held pressed against its seat in a bent position, will act as its own spring and will have initial springing even if not lifted off its seat.

In order that the said invention may be clearly understood and readily carried into effect, the same will now be described more fully with reference to the accompanying drawings, in which:—

Figure 1:
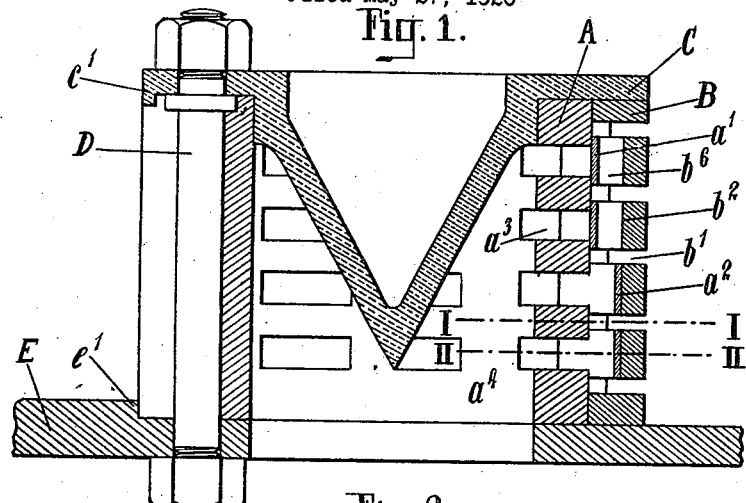
Fig. 1 represents a section through the centre line of the cylinders, along the dotted line III—III shown on the Fig. 2.

In Fig. 1. $a'$ shows the valve resting on its seat, $a^2$ is the valve lifted off its seat in working position, pressed against the stop. A is the inner cylinder, acting as a valve seat, $a^3$ are the passages, communicating with the inner space $a^4$, B is the outer cylinder, $b'$ are the passages or slots in the outer cylinder, $b^6$ are the recesses above the valves, $b^2$ are the stop-surfaces in the recesses. C is the valve cover, D are bolts or studs, by means of which the valve is flexed to the body E of a pump or compressor.

Figure 2:
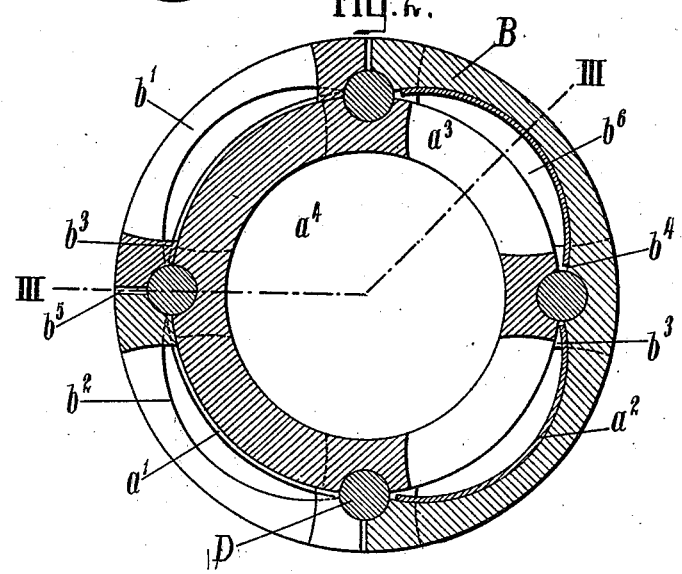
Fig. 2 shows a plan view section of the valve, on the lefthand side the section along the lines I—I, and on the righthand side the section along the line II—II on Fig. 1.

In Fig. 2 on the lefthand side, can be seen the slots in the outer cylinder, and the portions of the inner cylindrical wall of the outer cylinder $b^3$ which serve as side guides to the extreme ends of the valve strips.

On the right hand side the valves $a^2$ are shown lifted in working position, pressing against the stop-surfaces $b^2$ in the recesses $b^6$.

The passages $a^3$ covered by the valves, can be either plain single slots or short slots with dividing bridges or a number of round or square holes, over which the valve lies. The small portions of the bolt sides penetrate into recesses at the extreme ends at $b^4$ so as not to allow the recesses to become too shallow at each end, and jam the ends of the valves. These portions of the bolt sides also prevent the valves from moving too far lengthwise around the circumference of the inner cylinder. The assembled valve shown in drawings Figs. 1 and 2 is made of two whole cylinders; if desired, each cylinder could be made of a number of separate sections, which could be put together without any alteration to the principle of the design of this type of the valve.

As an example, on Figs. 1 and 2 on the left hand side, the outer cylinder is shown divided into sections vertically at $b^5$. To keep the sections together in the assembled valve, the cover C must be provided with an outside spigot at $c'$ and the face of the flange to which the valve is fixed must have a spigot at $e'$.

For higher pressures, if more strength with good elasticity is required, several thin valves one on top of the other can be placed in each recess. It is to be understood, that any number of valves can be arranged around the circumference of the cylinders and also any number of parallel rows of plate valves.

Figure 3:
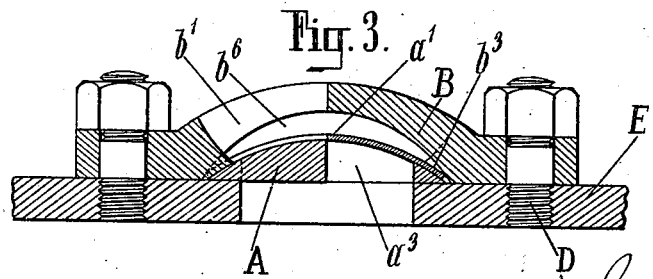
Fig. 3 is a sectional view of a modified form of my improved valve.

In Fig. 3 a valve is shown built up on a section of a cylinder, and fixed on to a flange sidewise.

On the left hand side the section is made through the slots in the outer cylindrical portion of the valve casing and on the right hand side through the plate valve.

All the letters in Fig. 3 have the same meanings as the ones in Figs. 1 and 2.

The underside of the recesses in the member B is acting as a stop, and is curved with a smaller radius than the radius of the valve seat A.

The relative curvature of these two members must be such, as to have sufficient clearance at each end of the recess, to allow the ends of the valves to move freely, without being jammed.

The plate valves can be flat when free, and are held in a bent position on the curved seats in the recesses by the extreme edges of the stop-surfaces in the recesses.

What I claim and desire to secure by Letters Patent of the United States of America is:—

1. A valve of the class described comprising an inner member having a curved convex outer surface and an opening extending thereto, an outer member having a curved concave inner surface opposed to said convex surface of the inner member, and a normally straight-spring valve strip arranged between said convex and concave surfaces and constrained, in the valve, to conform to the curvature of either the convex or the concave surface.

2. A valve of the class described comprising an inner member having a curved convex outer surface and an opening extending thereto, an outer member having a curved concave inner surface opposed to said convex surface of the inner member, and a normally straight-spring valve strip arranged between said convex and concave surfaces and constrained, in the valve, to conform to the curvature of either the convex or the concave surface, said outer member having guides for the ends of said flexible valve strip.

3. A valve comprising a hollow inner cylinder having passages in its wall, an outer cylinder having curved concave stop surfaces forming recesses in its inner side, normally straight-spring valve strips arranged in rows on the outer surface of said hollow inner cylinder over the passages in the wall thereof, said valve strips being arranged in the recesses of said outer cylinder, opposite the passages in the wall of the inner cylinder and constrained, in the valve, to conform to the curvature of either the convex or the concave surface, the said recesses of the outer cylinder coacting with the inner cylinder to form at the ends of said recesses guides for the ends of said flexible valve strips.

In witness whereof I affix my signature.

PAUL BELYAVIN.